Jan. 23, 1962 B. C. KEMPSON 3,017,750
HYDRAULIC APPARATUS
Filed July 7, 1960 2 Sheets-Sheet 1

INVENTOR.
BERTRAM C. KEMPSON
BY
Reynolds & Christensen
ATTORNEYS

Jan. 23, 1962   B. C. KEMPSON   3,017,750
HYDRAULIC APPARATUS

Filed July 7, 1960   2 Sheets-Sheet 2

INVENTOR
Bertram C. Kempson
BY Reynolds & Christman
ATTORNEYS

United States Patent Office 3,017,750
Patented Jan. 23, 1962

3,017,750
HYDRAULIC APPARATUS
Bertram Carl Kempson, St. Marks, Cheltenham, England, assignor to Dowty Hydraulic Units Limited, Tewkesbury, England, a British company
Filed July 7, 1960, Ser. No. 41,296
Claims priority, application Great Britain July 13, 1959
8 Claims. (Cl. 60—52)

This invention relates to servomotors, and more particularly, although not exclusively, to hydraulic servomotors. The invention is concerned with the kind of servomotor which comprises a motor energised by a power supply, a control for the motor carried by the movable member thereof, and a control unit for supplying power to the motor carried by the movable member and operable by lost motion between the control and the movable member to cause the latter to follow the movement of the control with a substantial degree of accuracy. The power supply may conveniently be a hydraulic pressure liquid supply, a pneumatic supply, an electric supply, or the like. For the purpose of this specification, this kind of servomotor will be referred to as "a servomotor of the kind referred to." The object of this invention is to provide in a servomotor of the kind referred to, an auxiliary control capable of exerting overriding control on the motor.

In accordance with the present invention, a servomotor of the kind referred to, includes an auxiliary control mounted in the movable member of the motor and capable of operating the control unit in an overriding manner in one or other direction. The control unit may be adjusted by the main control through the medium of a preloaded spring or springs and the auxiliary control carried in the movable member of the motor is then capable during operation of overcoming the preloading of the spring or springs to operate the control unit in the desired manner. Where the power supply for the servomotor is hydraulic, the control unit may comprise a simple hydraulic valve. The main control may be operated in any convenient manner such as by direct manual control, from a hydraulic control, or electrical control, whilst the auxiliary control may be operated also in any convenient manner by direct manual control, hydraulic control or electrical control, provided that the power for operating the auxiliary control may be transmitted to the movable member by flexible or equivalent means to accommodate movement of the movable member. In the case of hydraulic operation of the auxiliary control, the hydraulic pressure will be fed to the movable member through flexible hydraulic pipelines.

Figure 1:
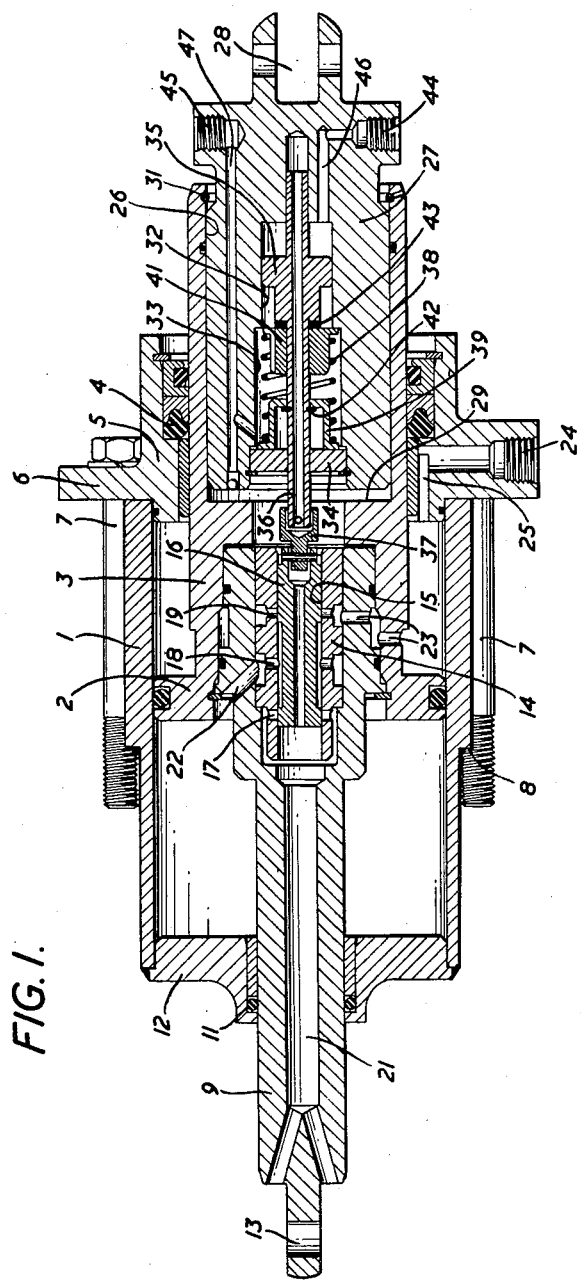
Figure 2:
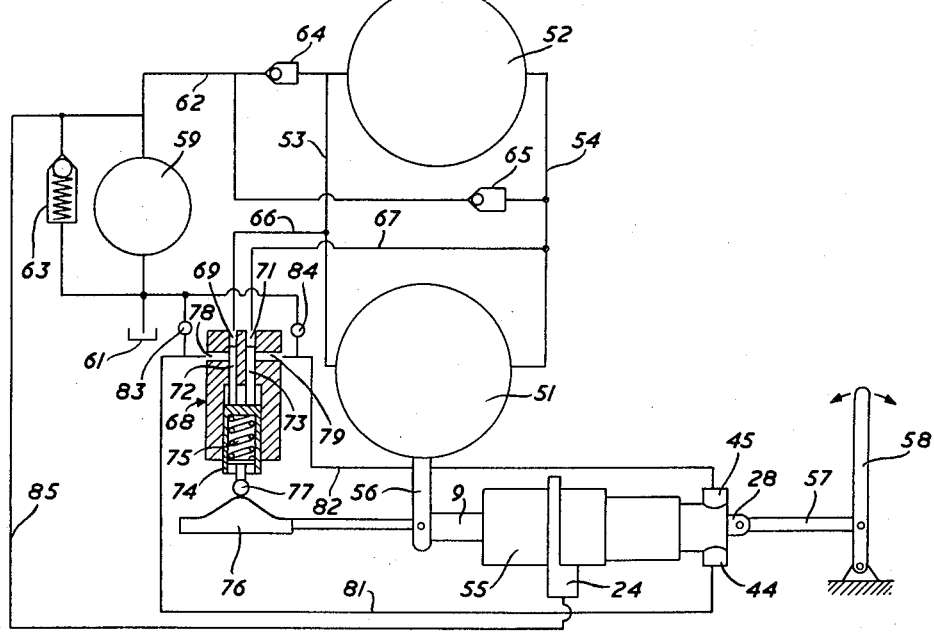

One example of the invention will be described with reference to the accompanying drawings, in which, FIGURE 1 is a cross-section through the servomotor, and, FIGURE 2 is a circuit diagram showing the servomotor in use in a hydrostatic transmission.

The hydraulic motor of the servomotor is of the piston and cylinder type comprising a hydraulic cylinder 1 and a piston 2 slidable within the cylinder 1. The piston 2 is carried by a plunger 3 of comparatively large diameter slidably mounted in a sliding seal 4 in an end cap 5 of the hydraulic cylinder 1. The servomotor, as illustrated, is intended for mounting within a variable displacement pump by means of a flange 6 carried by the end cap 5, screw threaded bolts 7 engaging within the pump to clamp the end cap 6 in position and, at the same time, to engage the cylinder in position by a shoulder 8 formed externally of the cylinder which engages a convenient abutment within the pump. A piston rod 9 of considerably smaller diameter than the plunger 3 extends from the piston through a sliding seal 11 of an end cap 12 secured by welding to the opposite end of the cylinder 1. The outer end of the piston rod 9 includes an eye 13 for securing to a pin within the pump which requires to be adjusted by the servo force developed on the piston 2. Within the plunger 3, a control valve unit 14 is mounted which comprises a cylindrical bore 15 within which a spool piston valve 16 is slidably mounted. Opening into the bore 15 are three ports 17, 18 and 19. The port 17 is in permanent connection with a passage 21 extending through the piston rod 9 which opens adjacent to the eye 13 into the interior of the pump casing, which is maintained at a very low or zero hydraulic pressure. The port 18 is connected to the space enclosed by the piston 2, the cylinder 1 and the end cap 12, by means of passage 22. The port 19 is connected by passages 23 to the space enclosed between the piston 2, cylinder 1 and the end cap 5. Pressure liquid is fed to the servomotor through a port 24 in the end cap 5 which enters directly by means of passage 25 the space enclosed between piston 2 and end cap 5.

The outer end of the plunger 3 is counterbored at 26 to accommodate a slide member 27 which forms the main control of the servomotor. This slide member conveniently terminates in a bifurcated eye 28 by which force is applied for control of the servomotor, manually or otherwise. The slide member 27 is located within the counterbore 26 to have a very small relative movement or lost motion which is defined by the movement of the slide member between contact with the bottom 29 of the counterbore and contact with a circlip 31 located at the open end of the counterbore. Within the slide member 27, a small cylinder 32 is formed so as to be co-axial with the slide member itself. At the inner end of the slide member the cylinder 32 is enlarged at 33, and the outer end of the enlargement 33 is closed by a cover 34. A piston 35 is slidably mounted within cylinder 32 and from this piston a piston rod 36 extends through the enlargement 33 and cover 34 for connection by a flexible connector 37 to the spool valve member 16. A compression spring 38 is located within the enlargement 33 and is located between a pair of sliding seat members 39 and 41. These seat members are arranged so that under the normal influence of the spring they seat respectively on the cover 34 and at the inner end of the enlargement 33. A pair of shoulders 42 and 43 are carried by the piston rod 36 for engagement by the seat members 39 and 41, and it is arranged that when the spring urges the seat members onto the cover 34 and the inner end of the enlargement 33, the shoulders 42 and 43 are also both engaged by the seat members so that the piston rod 36 is located by the preloading force of the spring within the slide member 27 against axial movement in one direction or the other. A pair of hydraulic connections 44 and 45 are located in the outer end of the slide member 27 and from these connectors passages 46 and 47 extend effectively to opposite ends of the cylinder 32 so that a pressure differential in either direction between hydraulic pressures at the connections 44 and 45 will act to urge the piston 35 in one direction or the other against the preloading of the spring 38.

For normal use, pressure liquid is fed into connector 24 to act on the right-hand area of piston 2 which is approximately one half of the left-hand area of piston 2. In the position shown, the piston valve 16 closes the ports 17 and 19 and thus entirely isolates liquid contained within the cylinder 1 between piston 2 and end cap 12. This liquid then forms a hydraulic lock which prevents movement of the piston against the action of pressure on the right-hand side of piston 2. If the main control formed by slide member 27 is moved to the right towards the circlip 31, piston valve 16 moves with the slide member or main control 27 to connect port 18 to port 19. Pressure liquid will then flow from the right-hand side to the left-hand side of the piston 2 to urge the piston to the right, the area of the piston over which this pressure acts being the difference between the effective areas of the right and left-hand sides of piston 2. As long as the slide member 27 is moved to the right, the piston 2 will follow under the action of the servo force. When the main control is stopped, the movement of the piston 2 will cause movement of the bore 15 over the piston valve 16 to isolate the port 19 from the port 18 and thus to isolate liquid on the left-hand side of piston 2 and to lock the piston in its attained position. If the main control 27 is moved to the left, port 17 is placed in connection with port 18 thus connecting the left-hand side of piston 2 to the passage 21 so that liquid contained therein may be vented to the low pressure interior of the pump casing. The pressure of liquid acting on the right-hand side of the piston 2 will then urge the piston 2 to the left. When the slide member 27 is stopped in its movement to the left the piston 2 will move a slight further amount to the extent that port 17 is isolated and the flow to the interior of the pump casing is stopped, the liquid trapped on the left-hand side of the piston then acting to lock the piston in position.

When it is desired to override the action of the main control, formed by the slide 27, a hydraulic pressure differential is applied in one direction or the other between the connections 44 and 45. For example, if it is desired that the piston 2 should move to the right, a high pressure is supplied to the connection 45 and a low pressure to the connection 44, which will act on the piston 35 to move it to the right and to engage shoulder 42 against the seat 39 to compress spring 38 and to move piston valve 16 to the right. In turn this will connect port 18 to port 19 and allow flow of pressure fluid from the right-hand side to the left-hand side of piston 2 thus urging the piston 2 to the right, until the pressure differential between the connections 44 and 45 is removed or alternatively the piston 2 reaches the end of its stroke. In so moving, the piston 2 will overcome any control force applied to the slide member 27. Similarly, if the pressure differential between connections 44 and 45 is applied oppositely to cause piston 35 to move to the left, shoulder 43 will engage seat member 41, the spring 38 will be compressed, and the piston valve 16 will move to the left to connect the left-hand side of piston 2 to the interior of the pump casing. The piston 2 will then move to the left either to the end of its stroke or until the pressure differential between connections 44 and 45 is cancelled.

The servomotor, as described, is particularly useful in the control of a hydrostatic transmission, and FIGURE 2 illustrates such an arrangement. The transmission is basically formed by a variable positive displacement pump 51, a fixed positive displacement motor 52 and a pair of pipelines 53 and 54 interconnecting the pump and motor. The servomotor, illustrated in FIGURE 1, is shown diagrammaticlly at 55, and the piston rod 9 is pivotally connected to a displacement adjusting lever 56 of the pump 51. The bifurcated connection 28 of the slide member is connected by a link 57 to displacement adjusting lever 58, arranged for manual adjustment. In order to prime the transmission, a boost pump 59 draws liquid from reservoir 61 and the pressure output at pipe 62 is controlled by a pressure loaded relief valve 63. The delivery from pump 59 passes by way of non-return valves 64 and 65 into the pipelines 53 and 54 of the transmission respectively, these non-return valves serving to prevent a flow of high pressure from the transmission into the pump 59. For the purpose of preventing overloading of the transmission, a pair of pipelines 66 and 67 extend from pipelines 53 and 54 to an overload sensing unit 68. Within this unit the pipes 66 and 67 connect to a pair of cylinders 69 and 71 within which plungers 72 and 73 are located for co-operation with a slide member 74 enclosing a variable compression spring 75. A cam 76 connected for adjustment by the displacement control lever 56 acts through a cam follower 77 to adjust the loading on the spring 75 such that the loading varies inversely as displacement of pump 51. Each of the pistons 72 and 73, if urged downwardly against spring 75, can uncover a port respectively 78 and 79 from which pipelines 81 and 82 extend to the connections 44 and 45 of the servo unit 55. Restrictors 83 and 84 connect the pipelines 81 and 82 to reservoir to prevent hydraulic pressure being maintained in these lines when the ports 78 and 79 are closed. Servo hydraulic pressure for operating the servomotor may also be taken from the output of pump 59 through pipeline 85 to the connection 24. When the transmission is in operation, it will be seen that movement of the lever 58 will cause movement of the slide member 27 and corresponding servo movement of the piston 2 which adjusts the displacement lever 56 of pump 51. Also, at the same time, the cam 76 is adjusted with the displacement lever 56. If for any selected displacement the pressure in either pipeline becomes excessive, the appropriate piston 72 or 73 will be depressed against loading of spring 75 to the extent that hydraulic pressure from the transmission is fed to port 78 or port 79. This pressure is then fed to one side or the other of the piston 35 in the unit 55 and will cause overriding action to be taken within the servo unit to cause reduction in the selected displacement. Such reduction will proceed until the pressure in the transmission reduces and/or the loading on the spring 75 is increased by cam 76 so that the piston 72 or 73 closes the appropriate ports 78 or 79.

Whilst the described embodiment incorporates a hydraulic piston 35 to effect the overriding control on the servomotor, it is within the scope of the present invention that any other convenient means of control may be employed. For example, the piston 35 and cylinder 32 may be replaced by a pair of solenoids alternately energisable to cause the rod 36 to move in one direction or the other. Flexible electrical connections would then be necessary to feed electric current into the sliding member 27. Again, alternatively, the rod 36 may be directly controlled mechanically by a Bowden cable or like flexible linkage. The motor, formed by the cylinder 1 and piston 2 as illustrated, is operated hydraulically but this may of course be replaced by any other convenient motor, such for example, as a pneumatic motor or an electric motor. In the case of an electric motor the control valve 16 may simply be replaced by switch contacts operated by movement of the rod 36. Again, whilst the illustrated invention is concerned with a linearly moving servomotor, the present invention also includes within its scope rotating servomotors in which a rotating motor moves in accordance with the rotational movement of a control. In such a case, a rotating control member would include the auxiliary control member and it may be necessary that rotating connections should be provided to carry control movement to the auxiliary control.

I claim as my invention:

1. A servomotor including a power driven member, a main control slidably carried by and having a lost motion connection to the power driven member, an operative connection extending directly between the power driven member and the main control, a control unit forming part of the operative connection arranged so that movement of the main control member operates on the control unit to cause movement of the power driven member in the sense to cancel the effect of main control movement on the control unit, and an auxiliary control also forming part of said operative connection and capable of applying movement to the control unit independently of the main control to cause power movement of the power driven member which is not cancellable by relative movement of the main control within its lost motion connection.

2. A servomotor as claimed in claim 1 wherein the auxiliary control comprises a link of variable length in the operative connection.

3. A servomotor as claimed in claim 2 wherein the auxiliary control comprises a pre-loaded spring and an auxiliary hydraulic piston and cylinder unit connected to the spring for adjustment of its length.

4. A servomotor as claimed in claim 1 wherein the movable member comprises a main piston movable within a cylinder, the control unit comprises a valve located within the main piston, the main control is slidably mounted on the main piston, and the operative connection includes an auxiliary piston and cylinder unit extending between the main control and the valve.

5. A servomotor as claimed in claim 4, wherein the hydraulic piston is arranged to have different effective areas on opposite sides, the hydraulic pressure is permanently connected to act on the smaller area, and the balanced valve acts to select the pressure applied to the larger area.

6. A servomotor as claimed in claim 5, wherein the auxiliary control comprises an auxiliary piston and cylinder unit carried within the slide member and at least one flexible hydraulic connection to carry a hydraulic signal pressure to the auxiliary piston and cylinder unit.

7. A hydrostatic power transmission comprising a driven variable positive displacement pump, a fixed displacement hydraulic motor in hydraulic connection with the pump, a servomotor as claimed in claim 6, arranged to adjust displacement of the pump and pressure sensitive means connected to the pump output to detect excess pressure and to feed such pressure through the flexible connection to the auxiliary piston and cylinder unit in the servomotor to cause overriding movement of the servomotor to reduce pump displacement and so to reduce pump output pressure.

8. A servomotor comprising a fixed and a movable member, the latter arranged for connection to a controlled device, a power source arranged for application to said movable member to move the same in either of two opposite senses, a control element mounted upon said movable member and shiftable relative thereto from a neutral position in either of two opposite senses, and operatively interposed between said power source and said movable member to effect movement of the latter in a sense corresponding to the sense of movement of the control element, a main control and an auxiliary control each mounted in said movable member, said auxiliary control being directly connected with said control element to move the latter when the auxiliary control is energized, and said main control being connected with lost motion to said control element to move the latter when the main control is energized, yieldable means interconnecting the main control and the auxiliary control for conjoint movement when the main control is energized, means to effect control movement of the main control, and hence of the interconnected auxiliary control and the control element, for normal operation, and means to supply power to the auxiliary control, for overriding movement thereof relative to the main control, and consequent control movement of the control element, through the lost motion between the main control and the auxiliary control, despite non-movement of the main control, under abnormal operational conditions.

References Cited in the file of this patent
UNITED STATES PATENTS

| | | |
|---|---|---|
| 1,760,915 | Robson | June 3, 1930 |
| 2,161,439 | Tooma | June 6, 1939 |
| 2,472,547 | Purcell | June 7, 1949 |
| 2,629,226 | Polson | Feb. 24, 1953 |